United States Patent [19]

Fink et al.

[11] Patent Number: 4,583,928

[45] Date of Patent: Apr. 22, 1986

[54] APPARATUS FOR REBUILDING PORTIONS OF MOLDED ELEMENTS, PARTICULARLY VEHICLE TIRES

[75] Inventors: Lothar Fink, Achim-Baden; Werner Fabarius, Lilienthal, both of Fed. Rep. of Germany

[73] Assignee: Desma-Werke GmbH, Achim beil Bremen, Fed. Rep. of Germany

[21] Appl. No.: 617,157

[22] Filed: Jun. 6, 1984

Related U.S. Application Data

[63] Continuation of Ser. No. 342,961, Jan. 26, 1982, abandoned, which is a continuation-in-part of Ser. No. 306,806, Sep. 29, 1981, abandoned, which is a continuation of Ser. No. 143,688, Apr. 25, 1980, abandoned.

[30] Foreign Application Priority Data

May 2, 1979 [DE] Fed. Rep. of Germany ....... 2917632

[51] Int. Cl.⁴ .............................................. B29D 30/54
[52] U.S. Cl. ....................................... 425/13; 264/36; 264/276; 425/17; 425/19; 425/26; 425/27
[58] Field of Search .............................. 425/11, 13–17, 425/20, 22, 26, 27, 32, 34 R, 35, 129 R, 183, 185, 542, 577, 19; 249/102, 145; 264/275, 326, 36, 276

[56] References Cited

U.S. PATENT DOCUMENTS

| | | | |
|---|---|---|---|
| 1,327,307 | 1/1920 | Brooks | 425/15 |
| 1,338,233 | 4/1920 | McCormick | 425/15 |
| 1,368,268 | 2/1921 | Legnard | 425/20 |
| 2,744,290 | 5/1956 | Corson | 425/13 |
| 2,808,619 | 10/1957 | Grund | 425/26 |
| 2,837,767 | 6/1958 | MacDonald | 425/13 |
| 2,895,208 | 7/1959 | Paxton | 249/145 X |
| 2,991,505 | 7/1961 | Van Scoyk | 425/14 |
| 3,038,204 | 6/1962 | Van Scoyk | 425/14 |
| 3,039,144 | 6/1962 | French | 425/14 |
| 3,794,452 | 2/1974 | Wolfe | 425/15 |
| 3,994,650 | 11/1976 | Nishimura et al. | 425/577 |
| 4,043,725 | 8/1977 | Schmidt | 425/542 |
| 4,129,406 | 12/1978 | Capecchi | 425/17 X |
| 4,167,379 | 9/1979 | Hautaud | 425/129 R X |
| 4,185,065 | 1/1980 | Knipp et al. | 264/308 X |
| 4,298,321 | 11/1981 | Gallizia | 425/129 R X |

FOREIGN PATENT DOCUMENTS

| | | |
|---|---|---|
| 1266063 | 5/1961 | France ........................... 425/11 |
| 643496 | 9/1950 | United Kingdom . |
| 759540 | 10/1956 | United Kingdom . |
| 964892 | 7/1964 | United Kingdom . |
| 1343397 | 1/1974 | United Kingdom . |
| 1362520 | 8/1974 | United Kingdom . |
| 1445609 | 8/1976 | United Kingdom . |
| 1471535 | 4/1977 | United Kingdom . |
| 1503668 | 3/1978 | United Kingdom . |
| 1509209 | 5/1978 | United Kingdom . |
| 1518307 | 7/1978 | United Kingdom . |

*Primary Examiner*—Jan Silbaugh
*Attorney, Agent, or Firm*—Sughrue, Mion, Zinn, Macpeak, and Seas

[57] ABSTRACT

As arc section of the casing 11 of a tire 10 to be retreaded is engaged on the outside by a mold element 15 defining a hollow mold chamber 17 and on the inside by a mushroom shaped counter mold element 16 configured to the inner contour of the casing. The relatively movable elements 15 and 16 are pressed towards each other to seal the chamber 17, and tread rubber is injected into the chamber and vulcanized to the casing. The mold elements are then retracted and the casing is rotated to a fresh arc section to thus retread the entire casing circumference in a stepped or successive manner.

2 Claims, 8 Drawing Figures

APPARATUS FOR REBUILDING PORTIONS OF MOLDED ELEMENTS, PARTICULARLY VEHICLE TIRES

This application is a continuation of application Ser. No. 342,961, filed Jan. 26, 1982, now abandoned, which is a continuation-in-part of application Ser. No. 306,806, filed Sept. 29, 1981, now abandoned, which is a continuation of application Ser. No. 143,688, filed Apr. 25, 1980, now abandoned.

BACKGROUND OF THE INVENTION

This invention relates to an apparatus for renewing or reconstructing portions of molded elements made from injectable and/or vulcanizable materials, particularly for rebuilding vehicle tires.

The reconstruction of vehicle tires by retreading or recapping is especially of interest for the tires of trucks and earth-moving machines. Because of the relatively low speeds of these vehicles the casings of the tires are subjected to relatively small loads during operation. This portion of the tire therefore remains intact over a long period of time, while the running surface or tread can become worn out and under certain conditions can be rebuilt many times.

SUMMARY OF THE INVENTION

In rebuilding vehicle tires, according to the invention circumferential sections of the tread are produced in succession with the full width of the tread or crown being included in each injection casting or vulcanizing cycle.

The apparatus of the invention is characterized by an injection casting and/or vulcanizing mold having at least two mold elements on respective sides of the section of the molded element to be treated. At least one mold element forms a hollow mold chamber enclosing the section to be rebuilt. The material is introduced therein by injection casting through a channel located in the hollow mold element.

In working with vehicle tires, a counter mold element is provided opposite the hollow mold element on the inside of the tire casing. This counter mold element preferably contacts the full inner surface of the casing in the area opposite the hollow mold element. The counter mold element is adapted to the geometric shape of the tire casing.

The invention can be used to great advantage in the renewal of the profile (tread pattern) of tires. The range of applicability prefers large tires such as those used with heavy earthmoving equipment. Tires of this type have a particularly pronounced profile which is subject to considerable wear and tear and the apparatus of this invention is particularly suited for the re-capping of such parts of such tires.

As an alternative, the recapping of tires may be performed by removing a layer of the tire as a whole or in part, in addition to the tread itself, so that merely the casing (together with the lateral parts of the tire), or a remaining layer on the said casing, are left. In this instance, by using the apparatus of the invention for purpose of recapping, not only can the profile be renewed, and thus the protruding, ribs, studs, etc., but also can an entire layer of tire, or a partial layer of tire connected to it. For this purpose, a special design of the injection mold of the invention is necessary. This, or rather the outside, hollow mold is supplied with lateral spacers, arranged around its circumference lying against the casing or the partial layer of the tire, respectively, thereby forming a sealed hollow space. At least one of these spacers which extend at right angles to the circumferential direction of the tire is designed to be removable. As soon as a first segment of the tire (with tread) has been completed, the hollow mold is advanced by one corresponding segment. The hollow form, in this position, then rests directly and without spacer against the already completed side of the last segment.

Even though this invention is primarily addressed to rebuilding vehicle tires, other types of molded elements are also capable of being treated in this manner, provided they have limited wall thickness. Examples include diving wet suits and the like, which may be subjected to premature wear at individual locations, and shoe soles. The apparatus according to the invention is also suited for the manufacture of new molded items.

BRIEF DESCRIPTION OF THE DRAWINGS

FIG. 6 is a device corresponding to FIG. 1 with removable spacers according to a further embodiment of the invention, FIG. 7 is a drawing corresponding to FIG. 6 with a changed relative position of the injection mold as well as of the tire, FIG. 8 is a highly simplified drawing of the running tread of a tire, as a horizontal projection, with details of the apparatus, also greatly simplified.

DETAILED DESCRIPTION OF THE PREFERRED EMBODIMENTS

Figure 1:
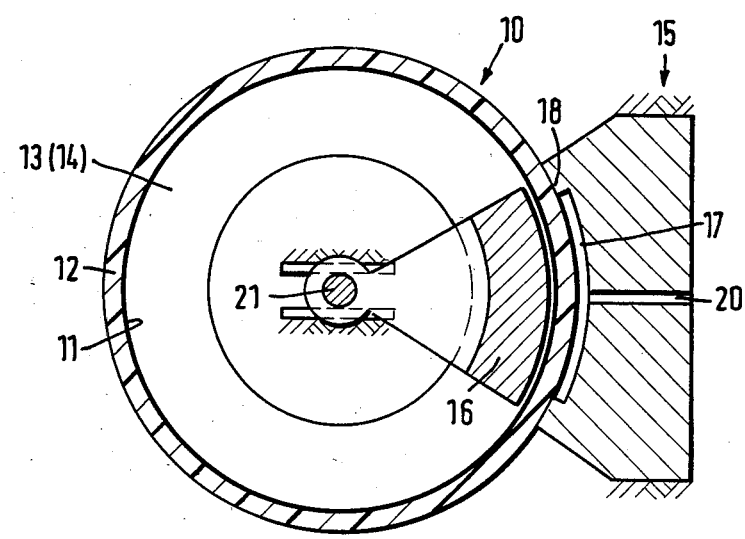
FIG. 1 is a simplified horizontal section of an apparatus for rebuilding vehicle tires according to the present invention.

The illustrated embodiments of the apparatus shown in the drawings relate to the preferred area of application of the invention, namely the retreading of vehicle tires 10. This type of molded element usually consists of an inside casing 11 and an outer running surface or tread 12. The latter consists of rubber, but may also be manufactured from suitable plastics. Sidewalls 13 and 14 of the tire 10 adjoin the tread 12.

The tread 12 of the tire is manufactured or rebuilt by the apparatusses shown. For this purpose the tire to be treated is placed in an injection casting apparatus consisting of at least two mold elements, namely a hollow mold element 15 lying on the outside of the tire and an opposing counter mold element 16 on the inside of the tire. The hollow mold element 15 defines a circumferential section of the tire 10 or the tread 12 to be formed during each operation or injection cycle. The mold element 15 forms a hollow mold chamber 17 opposite the tread 12 which is bounded in the circumferential direction by sealing edges 18 and laterally by sealing edges 19. The sealing edges 18 and 19 lie against the tire 10, sealing off the hollow mold chamber 17. A central injection channel 20, leads to the mold chamber 17. The wall of the mold element 15 opposite the tread 12 has a relief pattern corresponding to the tread to be manufactured.

The inner counter mold element 16 is formed as a stamp. It preferably extends at least over the entire contact area of the mold element 15 with the vehicle tire 10. The mold element 16 is geometrically structured to contact and thereby support the vehicle tire 10 over its entire surface opposite the section to be treated, and thus prevents the pressure in the mold chamber 17 during injection from deforming the casing 11.

The mold elements 15 and 16 are moveable relative to each other. In the embodiment according to FIGS. 1 and 2, the mold element 15 is mounted in a stationary manner, while the counter mold element 16 can be moved in a radial direction.

Figure 2:
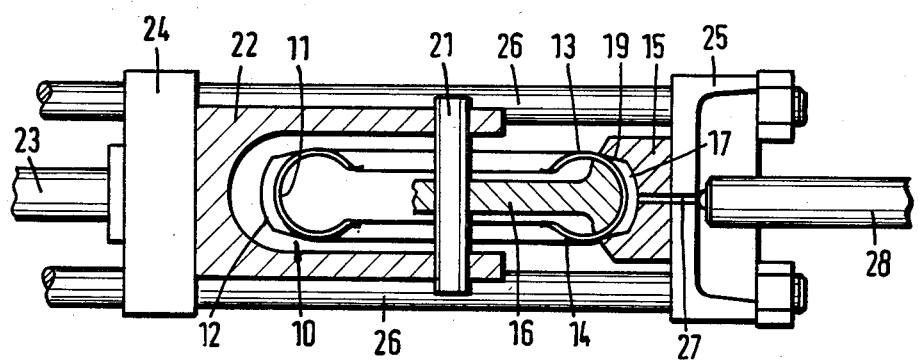
FIG. 2 is a vertical section of the apparatus according to FIG. 1 showing additional details thereof.

As may clearly be seen from FIG. 2, the mold element 16 is mounted on a center pin 21 which extends concentric to the tire, i.e. its axis is parallel to that of the tire. The forces necessary to press the mold element 16 against the inside of the tire are transferred to the center pin 21. A fork-like compression lever 22 engages the free ends of the center pin, and this lever in turn is acted upon by a pressurized cylinder 23. The reaction forces are absorbed by base plates 24 and 25, which are connected with each other by tie rods 26. In the embodiment shown in FIG. 2, the mold element 15 is rigidly mounted on the base plate 25. The pressurized cylinder 23, the piston rod of which acts on the compression lever 22, is connected to the opposite base plate 24. The base plate 25 is provided with a connecting bore 27 which communicates with the injection channel 20 of the mold element 15. As schematically shown, the material is introduced into the mold chamber 17 from the side of the base plate 25 by an injection apparatus 28.

The apparatus according to FIGS. 1 and 2 incorporates a horizontal arrangement of the vehicle tire 10. In this apparatus the tire is indexed or partially rotated about its own vertical axis by any conventional drive means, not shown, as the new tread 12 is produced. Suitable heating means, also not shown, would of course be included in at least the hollow mold element 15 to implement vulcanization.

Figure 3:
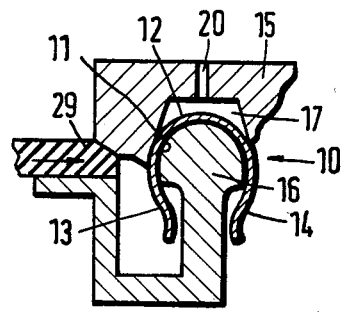
FIG. 3 is a schematic vertical section through an alternative embodiment of the apparatus.

FIG. 3 shows an alternative embodiment of the apparatus, although here an embodiment using an upright tire was selected for purposes of illustration. The mechanical loads to which the tire 10, i.e. the casing 11 is subjected due to the necessary closing or sealing forces of the mold can be quite large. The purpose of the modification shown in FIG. 3 is to maintain the load on the casing 11 within limits, without losing the necessary closing pressure on the mold. Accordingly, a wedge-shaped support element 29 is introduced between the hollow mold element 15 and the counter mold element 16. In this procedure the elements 15 and 16 are moved toward the previously manufactured casing 11 until a sufficient pressure of the sealing edges 18, 19 is assured on the casing. The wedge element 29 is then moved into the position between the mold elements and the additional necessary closing pressure is applied. The wedge element 29 does not allow this additional pressure to be transferred to the casing 11.

Figure 4:
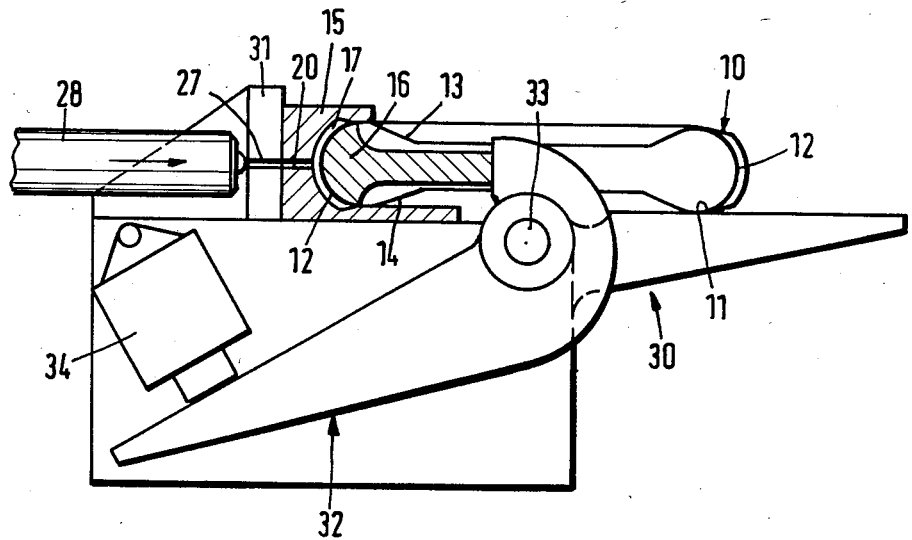
FIG. 4 is a vertical section through a side view of a further embodiment of the apparatus for rebuilding vehicle tires.

The apparatus according to FIG. 4 is also employed with a horizontal arrangement of the vehicle tire. The hollow mold element 15 is rigidly connected to a table frame and abuts a stop element 31. A connection bore 27 is provided in the mold element 15 as a continuation of the injection channel 20 for the introduction of material by an injection apparatus 28.

The counter mold element 16, in turn, can be pressed radially against the tire by a two-armed compression lever 32, which is pivotable about a bearing 33 formed on the table frame 30. A pressurized fluid cylinder 34 acts on the free end of the longer arm of the compression lever 32. Because of the curved position of the shorter lever arm the compressive force is diverted radially into the horizontal plane.

Figure 5:
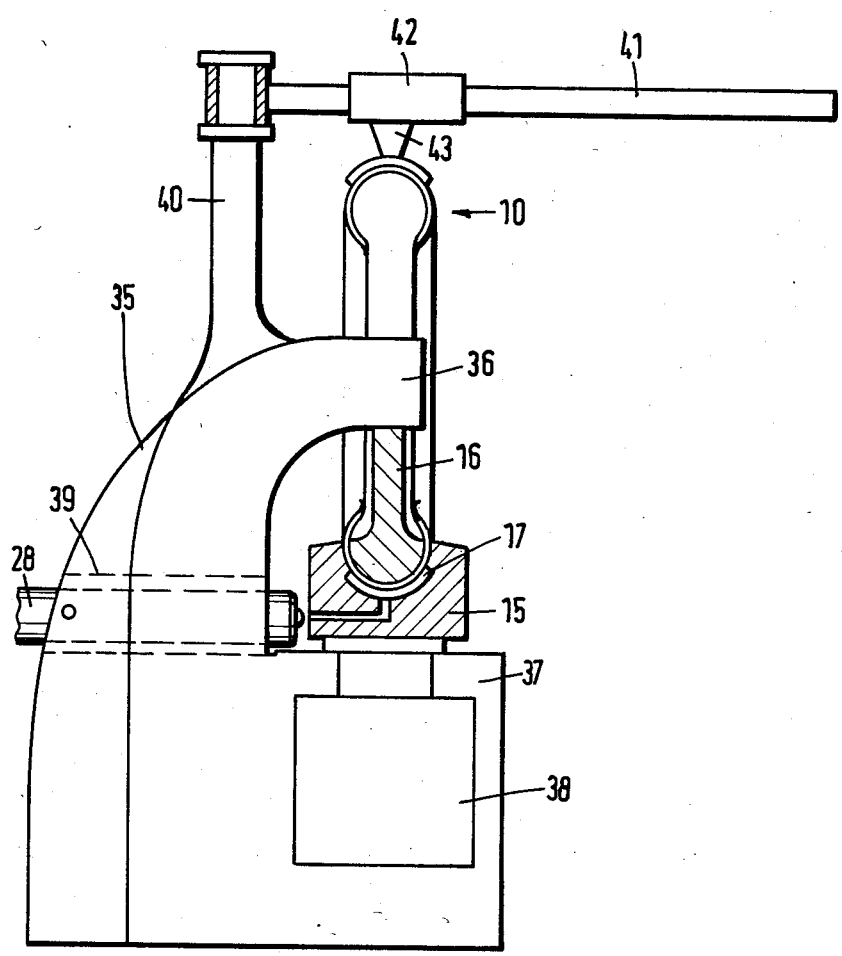
FIG. 5 is a partial vertical section through a side view of an embodiment of the apparatus including an upright arrangement of the vehicle tire.

The alternative shown in FIG. 5 includes a stand 35 as a support frame for the tire and the injection casting mold. The tire is arranged here in a vertical position. A curved horizontally directed supported arm 36 projects into the area of the tire approximately at the center thereof, and supports the downwardly directed counter mold element 16. Here the lower hollow mold element 15 located on the outside of the tire is vertically moveable relative to the tire to produce the necessary sealing or closing pressure. A pressurized fluid cylinder 28 is arranged in a platform 27 of the stand 35, the piston rod of which acts on the mold element 15.

The injection apparatus 28, which is only partially shown here, is brought to the mold element 15 from the back side of the stand 35 rather than from the free open side thereof. An opening 39 is formed in the support arm 36 in the stand 35 for the passage of the injection apparatus 28.

The apparatus is further provided with an apparatus for the handling of the tire as well as the mold elements 15 and 16. A laterally arranged, pivotable bracket arm 41 is disposed on an upright support pillar 40. A stroke mechanism 43 is slidably arranged thereon by means of a sleeve 42, for taking hold of, lifting and moving the tire 10.

In the embodiment as shown in FIG. 6, a tire to be recapped has previously been stripped down to its casing 11, or down to a relatively thin remaining layer 44, in particular having been peeled off. In recapping this tire, not only must a tire profile (studs, etc.) 45, be applied, but also a layer of the running tread 46.

In doing so, the process is done segment by segment, just as with the other embodiments. The injection mold, consisting of the hollow mold 15 and counter mold 16 is placed against the tire in the described manner, thereby creating the hollow space for the creation of the tire tread 45 (profile) and a segment of the running tread 46. This hollow space is delineated laterally, as well as in the circumferential direction of the tire 10 by spacers 47, 48 and 49. These spacers 47 and 48 extend at right angles to the circumferential direction of the tire 10 and are curved correspondingly.

Upon completion of a segment corresponding to the size of the hollow mold 15, the latter is moved ahead by the distance corresponding to another segment, or the tire is rotated, respectively. The following segment is to immediately adjoin the previous one. The already produced segment, on one side, forms the border for the hollow space of the mold. In order to guarantee a tight fit of the hollow mold against this segment, the spacer 48, which is removable, is taken out of the hollow mold. The latter is then fitted against the previously formed tire segment, so as to slightly overlap. This creates a new hollow space (FIG. 7). The process continues in the same manner, segment by segment. The last segment of the tire is then made within a hollow space which is delineated on both sides by the already produced tire segments. During the operation of the manufacture of this last segment, spacer 47 is removed, so that both lateral parts of the hollow mold (as seen in the circumferential direction) rest directly against the already produced running tread 46. The various embodiments of the device, especially those of FIG. 6–8, are suitable and preferably for the production of new tires also. In this instance, the running tread with the noted profile is produced immediately on the casing, and again in the manner described above.

The apparatus is especially well suited for working on vehicle tires, because this type of molded element exhibits significant mass tolerances so that an annular, closed mold is not feasible. Working with individual sections makes it possible to obtain a simple, sufficiently precise adaptation to the mold elements used. This is also true for the process explained in conjunction with FIG. 3 relating to the stepwise placement of the sealing and closing pressure of the mold. Similar problems are also observed in the molding of shoe soles or shoe elements on a separately produced shaft consisting of, for example, leather, where the concern is providing sufficient pressure between the mold element (sole mold) and the shaft to form a seal, but not so much that it would cause damage to the mold element. In this process the necessary sealing or closing pressure can be brought to bear in the sense of FIG. 3 in steps. First, the mold elements 15 and 16 are moved into abutment with the casing 11 or with a similar corresponding portion of the workpiece under a reduced sealing pressure. The support member (wedge element 29) is thereafter brought into position between the mold elements. The necessary mold closing pressure can then be brought to bear.

What is claimed is:

1. A device fo retreading portions of casings utilizing vulcanized rubber, especially for the sectional retreading of automotive tires, comprising:

(a) an injection molding and vulcanization mold having at least two integral mold parts (15, 16) which are separable from one another, one of said mold parts being positioned on one side of a casing at a section of said casing to be retreaded, and another of said mold parts being positioned on the other side of said section of said casing to be retreaded, a first one (15) of said mold parts forming a mold cavity (17) with said section of said casing to be retreaded on an outer surface of said casing, said first one of said mold parts having lateral sealing means for said mold cavity comprising sealing edges sealed to said casing, a second one (16) of said mold parts being fitted to the shape of the interior of said casing and serving as a support for the entirety of said section of said casing to be retreaded;

(b) a support member (29) insertable between said first and second ones of said mold parts in a closed position of said mold parts, said support member being wedge-shaped and disposed so as to carry a closing pressure between said first and second mold elements such that only a small sealing pressure is transmitted by said mold elements to said casing, said wedge-shaped support member being located between said first and second ones of said mold parts at a position radially spaced from said mold cavity; and (c) means arranged at right angles to a circumferential direction of said casing for sealing said mold cavity in a manner such that said mold cavity can be positioned in an area directly adjacent a previously produced segment of a running tread molded by said mold, whereby plural segments may be formed successively in a circumferential direction of said casing.

2. A device for retreading portions of casings utilizing vulcanized rubber, especially for the sectional retreading of automotive tires, comprising:

(a) an injection molding and vulcanization mold having at least two integral mold parts (15, 16) which are separable from one another, one of said mold parts being positioned on one side of a casing at a section of said casing to be retreaded, and another of said mold parts being positioned on the other side of said section to be retreaded, a first one (15) of said mold parts forming a mold cavity (17) with said section of said casing to be retreaded on an outer surface of said casing, said first one of said mold parts having lateral sealing means for said mold cavity comprising sealing edges sealed to said casing a second one (16) of said mold parts being fitted to the shape of the interior of said casing and serving as a support for the entirety of said section of said casing to be retreaded;

(b) a support member (29) insertable between said first and second ones of said mold parts in a closed position of said mold parts, said support member being wedge-shaped and disposed so as to carry a closing pressure between said first and second mold elements such that only a small sealing pressure is transmitted by said mold elements to said casing, said wedge-shaped support member being located between said first and second ones of said mold parts at a position radially spaced from said mold cavity; and (c) spacer means movable with said first mold part and arranged at right angles to a circumferential direction of said casing for sealing said mold cavity in a manner such that said mold cavity can be positioned in an area directly adjacent a previously produced segment of a running tread molded by said mold, whereby plural segments may be formed successively in a circumferential direction of said casing.

* * * * *